United States Patent [19]
Mouri et al.

[11] Patent Number: 4,532,593
[45] Date of Patent: Jul. 30, 1985

[54] ELECTRONIC CONTROL METHOD AND APPARATUS FOR INTERNAL COMBUSTION ENGINE

[75] Inventors: Yasunori Mouri; Osamu Abe; Akira Teragakiuchi, all of Katsuta, Japan

[73] Assignee: Hitachi, Ltd., Tokyo, Japan

[21] Appl. No.: 377,161

[22] Filed: May 11, 1982

[30] Foreign Application Priority Data

May 13, 1981 [JP] Japan ................... 56-70804

[51] Int. Cl.³ .............. F02D 35/00; G11C 29/00; G01M 15/00
[52] U.S. Cl. ................ 364/431.11; 123/479; 371/25; 364/431.12
[58] Field of Search ............ 364/431.11; 123/479; 73/117.3, 118; 371/21, 25, 29; 340/52 F

[56] References Cited

U.S. PATENT DOCUMENTS

| | | | |
|---|---|---|---|
| 3,579,199 | 5/1971 | Anderson et al. | 371/21 |
| 3,838,264 | 9/1974 | Maker | 371/21 X |
| 4,267,569 | 5/1981 | Baumann et al. | 364/424 |
| 4,271,402 | 6/1981 | Kastura et al. | 340/52 F |
| 4,287,503 | 9/1981 | Sumida | 340/52 F |
| 4,317,364 | 3/1982 | Asano et al. | 73/117.3 |
| 4,337,513 | 6/1982 | Furuhashi | 364/461.11 |
| 4,369,511 | 1/1983 | Kimura et al. | 371/21 |
| 4,402,217 | 9/1983 | Higashiyama | 73/117.3 |
| 4,414,665 | 11/1983 | Kimura et al. | 371/21 |

OTHER PUBLICATIONS

Palmer et al.: Random Access Memory Disturb Test Circuit, IBM Technical Disclosure Bulletin, vol. 21, No. 2, Jul. 1978, pp. 591/592.
Grimm et al.: GM Micro-Computer Engine Control System, Soc. of Autom. Engineers, Paper #800053, (1980).
Walters: Electronic Emission Control Diagnoses Its Own Problems, Automotive Engineering, Aug. 1980, vol. 88, No. 8, pp. 43/49.
Bowler: Throttle Body Fuel Injection Automotive Engineering, Oct. 1980, vol 88, No. 10, pp. 102-110.
Rogers: Checking Random-Access Memory, pp. 4173/4174, IBM Technical Disclosure Bulletin, vol. 20, No. 10, Mar. 1978.

*Primary Examiner*—Felix D. Gruber
*Attorney, Agent, or Firm*—Antonelli, Terry & Wands

[57] ABSTRACT

The data processing unit of an engine control apparatus constantly fetches signals flowing from the sensors and signals flowing to the actuators, and decides whether the respective fetched signals are normal or abnormal to thereby store the results of the decision as diagnosis data in a random access memory.

The data processing unit stores a predetermined code in a predetermined area of the random access memory, carries out the engine control data processing operations in accordance with the diagnosis data, and writes the predetermined code in the predetermined area of the random access memory and clears data of all areas of the random access memory other than the predetermined area to thereby carry out the engine control data processing when the read data is determined not to be equal to the predetermined data.

2 Claims, 3 Drawing Figures

ELECTRONIC CONTROL METHOD AND APPARATUS FOR INTERNAL COMBUSTION ENGINE

The present invention relates to an electronic control method and apparatus for an internal combustion engine in which actuators are controlled by use of a microcomputer in response to outputs from sensors, or more in particular to an electronic control method and apparatus for an internal combustion engine having a self-diagnosis function for constantly checking whether or not signals are normally transmitted from the sensors to the microcomputer and from the microcomputer to the actuators.

In recent years, an electronic control apparatus for an internal combustion engine has been developed for controlling an engine fuel system, an ignition system, an EGR system and the engine speed by use of a microcomputer in response to signals from sensors.

Such an apparatus generally includes a self-diagnosis function of constantly deciding whether or not signals are normally transmitted between sensors and a microcomputer and between the microcomputer and actuators, the results of decision being stored in a memory or RAM as diagnosis data.

An example of such an electronic control apparatus for an internal combustion engine is disclosed in U.S. Pat. No. 4,267,569. In this case, the diagnosis data is often desirably kept in the memory even when the power supply of the control unit is cut off, so that the appartatus is required to be provided with a function to continuously supply power to the memory from a separate power supply system in order not to erase the data in the memory even when power is cut off, namely, a function to back up the memory is required.

For this purpose, conventionally, an input is arbitrarily applied to the microcomputer in order for the microcomputer to detect whether the memory has been backed up or not. If it is detected that the memory backup function has been maintained, the result of self diagnosis is held in a predetermined area of the memory by preventing the erasure of the diagnosis data when the power for the control unit is turned on. In the event that it is detected that the memory backup function has not been maintained, on the other hand, the data in all the areas of the memory is erased so as to prepare for storing new self diagnosis data.

This operation for arbitrarily making the microcomputer detect whether or not the memory has been backed up is very complicated.

Further, since both an electric power for backing up the memory and for the control unit are supplied from a common battery mounted on the vehicle, the correct diagnosis data held in the memory is changed when the battery is removed and mounted again, with the result that if the resulting data is used as the diagnosis data, an erroneous result is reached.

An object of the present invention is to provide an electronic control method and apparatus for an internal combustion engine having a highly reliable self diagnosis function of deciding automatically whether or not the memory for storing the self diagnosis data has been backed up.

In order to achieve the above-mentioned object, there is provided, according to the present invention, a control apparatus for an internal combustion engine including sensors for producing signals representative of operating conditions of the engine, actuators for controlling respective energy conversion functions of the engine in response to control signals applied thereto, an input/output unit coupled to receive signals produced by the sensors and to deliver control signals to the actuators, a data processing unit coupled to the input/output unit for carrying out engine control data processing operations in accordance with signals produced by the sensors and thereby generating engine control values that are coupled to the input/output unit, and a random access memory supplied with electric power separately from a common power source. The data processing unit operates to constantly fetch signals flowing between the sensors and the input/output unit and signals flowing between the input/output unit and the actuators, deciding whether the respective fetched signals are normal or abnormal and to store the results of the decision as diagnosis data, further storing a predetermined code in a predetermined area of the random access memory. In the data processing unit, the engine control data processing operations are carried out in accordance with the diagnosis data when the read data is determined to be equal to the predetermined data, and the predetermined code is written in the predetermined area of the random access memory and data of all areas of the random access memory othe than the predetermined area is cleared to thereby carry out the engine control data processing, when the read data is decided not to be equal to the predetermined data.

The present invention will be apparent from the following detailed description taken in conjunction with the accompanying drawings, in which.

Figure 1:
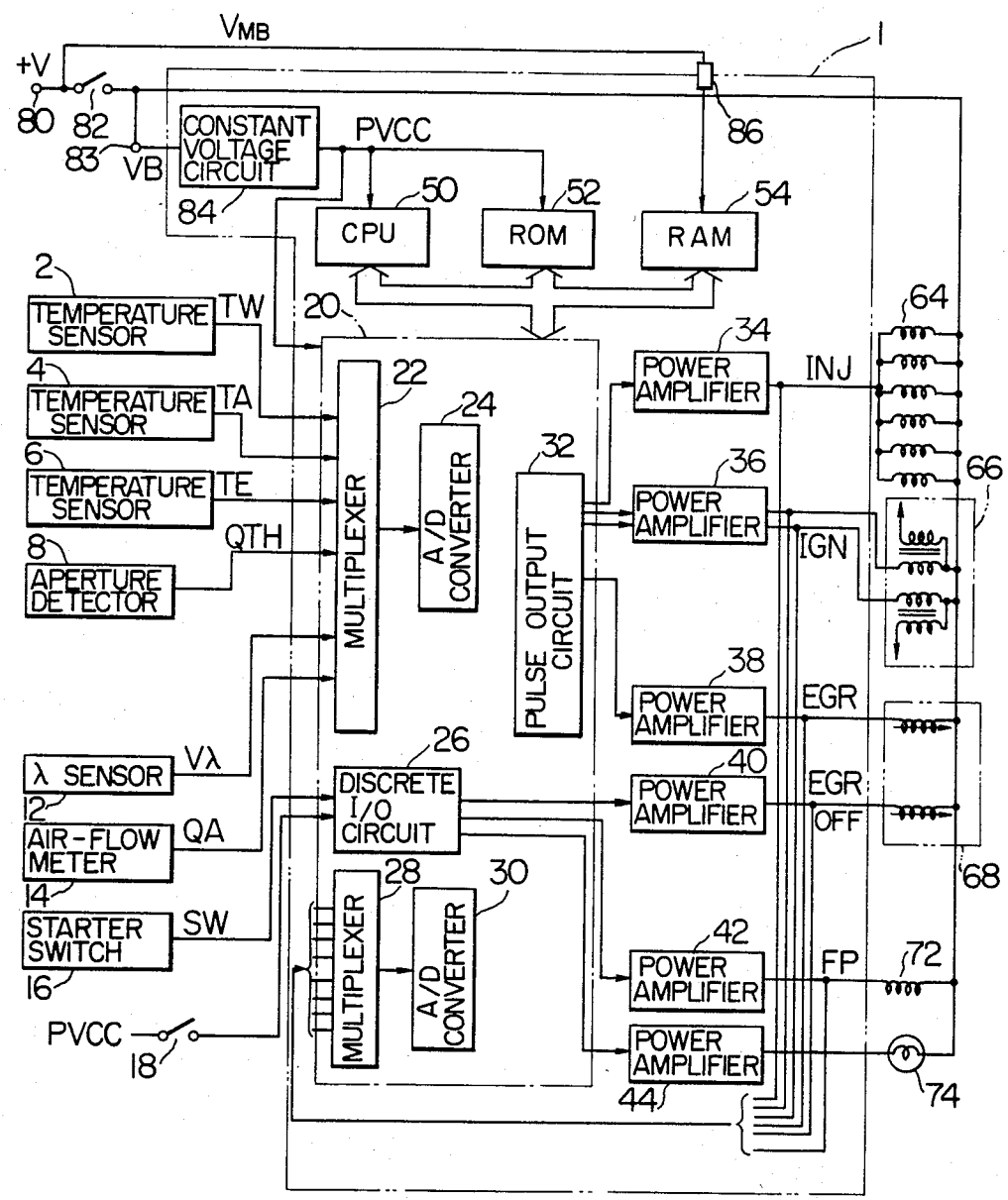
FIG. 1 is a diagram showing the configuration of an embodiment of the electronic control apparatus for an internal combustion engine according to the present invention.

The configuration of an embodiment of the electronic control apparatus for an internal combustion engine according to the present invention is shown in FIG. 1. In the drawing, reference numerals 2 to 14 designate sensors, the output signals of which are applied to a control circuit 1 and through an input/output circuit 20 to a CPU 50. The CPU 50 is operated on the basis of program data stored in a read-only memory (hereinafter referred to as a ROM) 52. The outputs of the CPU 50 are applied through the input/output circuit 20 and power amplifiers to actuators 64 to 72. In response to the applied outputs of the CPU 50 the actuators 64 to 72 are operated thereby to regulate the fuel flow rate to the engine, ignition timing, exhaust gas recycle rate and the engine speed etc. to proper values.

In FIG. 1, only part of the sensors and actuators actually used are shown for facilitating the description.

Among the sensors, reference numeral 2 designates a water temperature sensor, numeral 4 an intake air temperature sensor, numeral 6 an exhaust gas temperature sensor, numeral 8 a throttle aperture detector, numeral 12 a λ sensor, and numeral 14 an air-flow meter. Among the actuators, numeral 64 designates a fuel injector, numeral 66 an ignition coil, numeral 68 an exhaust recycle apparatus, and numeral 72 a fuel pump.

A control apparatus having the above configuration is disclosed, for example, in U.S. Pat. No. 4,277,829.

The construction of FIG. 1 will be explained more in detail below.

A positive power source terminal 83 of the control circuit 1 is connected with a positive electrode 80 of a battery (not shown) through a key switch 82 to provide a voltage VB for the control circuit 1. The power source voltage VB is adjusted to a constant voltage PVCC of, for example, 5 volts by a constant voltage circuit 84. This constant voltage PVCC is applied to the CPU and ROM. The output PCVV of the constant voltage circuit 84 is supplied also to the input/output circuit 20.

The input/output circuit 20 includes therein multiplexers 22, 28, analog-digital converters 24, 30, a pulse output circuit 32 and a discrete input/output circuit 26.

The multiplexer 22 receives plural analog signals, selects one of the analog signals in accordance with the instruction from the CPU, and sends the selected signal to the A/D converter 24. The analog signal inputs applied to the multiplexer 22 are the outputs of the various sensors shown in FIG. 1; an analog signal TW from the sensor 2 representing the temperature of the cooling water in the water jacket of the engine, an analog signal TA from the sensor 4 representing the temperature of the intake air, an analog signal TE from the sensors 6 representing the temperature of the exhuast gas, an analog signal QTH from the throttle aperture detector 8 representing the aperture of a throttle valve (not shown), an analog signal $V_\lambda$ from the $\lambda$ sensor 12 representing the air-excess rate of the mixture of fuel and air, and an analog signal QA from the air-flow meter 14 representing the flow rate of air.

The CPU 50, the RAM 54, the ROM 52 and the input/output circuit 20 are interconnected respectively by a data bus, an address bus and a control bus.

The multiplexer 22 of the input/output circuit 20 receives as its analog inputs the cooling water temperature TW, the temperature TA of the intake air, the temperature TE of the exhaust gas, the throttle vavle aperture QTH, the output $V_\lambda$ of the $\lambda$ sensor and the quantity QA of the intake air.

The CPU specifies the address of each of these input signals through the address bus in accordance with the instruction program stored in the ROM and the input having a specified address is passed through the multiplexer 22 to the analog/digital converter 24 and the output of the converter 24, i.e. the digital-converted value, is held in an associated register (not shown) in the CPU. The stored value is taken in, if desired, to the CPU 50 or RAM 54 in response to the instruction sent from the CPU through the control bus.

The signals are processed by the CPU 50 and applied to the pulse output circuit 32. The output of the pulse output circuit 32 is sent to a power amplying circuit 34 and the panel injector 64 is controlled by the output signal of the power amplifying circuit 34.

Power amplifying circuits 36 and 38 respectively control the primary current of the ignition coil 66 and the aperture of the exhaust recycle apparatus 68 in accordance with the output pulses of the pulse output circuit 32. The discrete input/output circuit 26 receives and holds an input from a starter switch 16 and an input from a manual switch 18 for commanding the reading out of the self-diagnosis data from the RAM.

The discrete input/output circuit 26 also sends signals, in response to the CPU 50, to the power amplifying circuits 40, 42 and 44 so that the exhaust recycle apparatus 68 is closed to stop the recycle of exhaust gas, the fuel pump 72 is controlled and the result indicated by the self-diagnosis data read out of the RAM is displayed by a lamp 74.

The input/output circuit 20, ROM and CPU are supplied with the power source voltage PVCC from the battery mounted on a vehicle through the constant-voltage circuit 84 and an ignition key switch 82, while the RAM 54 is supplied with the power source voltage $V_{MB}$ not through the ignition key switch 82 but directly from the battery through the positive terminal 80 and a connector 86. Even when the ignition key switch 82 is turned off, therefore, the data stored in the RAM 54 is held, namely, the memory is backed up.

The RAM 54 is a volatile memory such as a N-MOS memory for storing the self-diagnosis data. Specifically, the output signals of the sensors 2 to 14 are fetched sequentially through the multiplexer 22, and the CPU checks to see whether the value of each input is abnormal or not in comparison with predetermined upper and lower limit values stored in the ROM, so that it is decided whether or not the sensors or the output signal lines thereof and the connectors (not shown) are abnormal. The results of decision are stored in the RAM. Further, the signals are fetched from respective connection lines between the actuators 64 to 72 and the power amplifiers 34 to 42 through the multiplexer 28, and it is checked to determine, after A/D conversion in converter 30, whether these signals represent abnormal values in comparison with the values stored in the ROM. It is thus decided whether or not the connection lines and connectors (not shown) are abnormal, and the results thereof are stored in the RAM. The results of decision on the sensors and actuators stored in the RAM usually takes the form of a binary signal, such as a 1-bit binary signal, which is "0" when the decided result is normal and "1" when the decided result is abnormal, for example.

Figure 2:
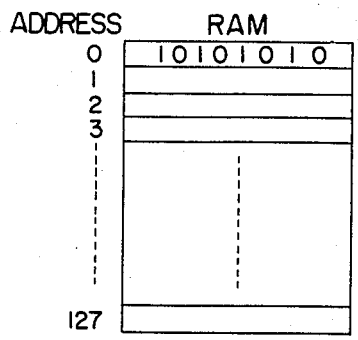
FIG. 2 is a diagram for explaining an example of a RAM incorporated in the control apparatus shown in FIG. 1.

This random access memory 54 has addresses 0 to 127, for example, as shown in FIG. 2, of which specific data such as an 8-bit data "10101010" is stored in the area corresponding to an address 0 when the self-diagnosis operation is executed. Namely, data indicating whether the RAM has been backed up by the battery or not is stored in the area of address zero. If the RAM has been backed up by the battery, the specific 8-bit data "10101010" is stored at the address zero, while if the RAM has not been backed up by the battery, other data is stored therein. Data indicative of whether or not the sensors 2 to 14 or the output signal lines thereof are abnormal is stored in part of the areas corresponding to the addresses 1 to 3, for example and data indicative of whether or not the connection lines between the actuators 64 to 72 and the power amplifier circuits is abnormal is stored in the remaining areas of the same addresses. Furthermore, various data required for control of the engine is stored in the areas of addresses 4 and so on.

According to the present invention, it is thus possible to automatically decide whether or not the RAM has been backed up, by reading out the data at the address zero of the RAM.

Now, the operation of the control apparatus of FIG. 1 will be described with reference to a flowchart of FIG. 3. According to the present invention, in response to the turning on of the ignition key switch 82 and subsequent power supply to the input/output circuit 20, ROM and CPU, the CPU 50 is operated automatically according to the flowchart of FIG. 3 on the basis of the program stored in the ROM. First, the data stored in the address zero of the RAM is read to check whether or not the RAM has been backed up. If the RAM has been backed up, the engine control is carried out on the presumption that the self-diagnosis data stored in the RAM is considered correct. If the RAM has not been backed up, on the other hand, it is decided that the diagnosis data stored in the RAM is erroneous and the contents of the RAM are cleared.

First, upon turning on of the ignition key switch 82, the program stored in the ROM starts and the process proceeds to step 100. At step 100, the data in the area corresponding to the address 0 of the RAM 54 is read and it is checked to see whether or not the value thereof is "10101010". If it is "10101010", it shows that the RAM has been backed up and it is decided that the diagnosis data stored in the RAM is correct, so that the process proceeds to step 102. The step 102 clears the data in all the areas of addresses four and following numbers as well as the diagnosis data in all the areas of addresses 1 to 3 other than the data (abnormal data) determined abnormal and the data in the area of address 0.

The process then proceeds to step 104 where the initial values required for engine control are set in the areas of addresses four and following numbers.

In the event that it is decided at step 100 that the data at the address 0 is not "10101010", it indicates that the memory has not been backed up or the RAM has been supplied with the memory backup power supply $V_{MB}$ for the first time, and data stored in the area corresponding to not only the address 0 but also remaining addresses take values incapable of being estimated. Thus, the self-diagnosis data is considered also erroneous.

The process then proceeds to step 106 for storing the code of "10101010" in the area corresponding to the address 0, followed by step 108 where the data in all the areas other than the address 0 are cleared. The process is then passed to step 104.

Subsequently, the process proceeds to step 110 for executing an ordinary engine control program on the basis of the diagnosis data of the RAM. Such an engine control program is shown, for example, in U.S. Pat. application Ser. No. 137,519 entitled "Electronic type engine control method and apparatus", filed Apr. 4, 1980 by T. Furuhashi, now U.S. Pat. No. 4,337,513.

The step 112 fetches the output signals of the sensors and the signals from the inputs of the actuators sequentially and checks to see whether the signals are abnormal or not, so that the results thereof are stored as self-diagnosis data in the areas corresponding to the addresses 1 to 3 of the RAM.

Next, at the step 114 it is checked to see whether or not the switch 18 is turned on, namely, whether or not the self-diagnosis data is ordered to be read out. If the switch 18 is turned on, the codes representing the sensor or actuator corresponding to the abnormal data among the data stored at the addresses 1 to 3 of the RAM are read out of the ROM, and the signal thus read out is displayed by the display unit, namely, the lamp 74 through the input/output circuit 20 and the power amplifier 44.

The process is then returned to step 110 to execute the engine control program. If it is detected that the switch 18 is turned off at step 114, the process is directly returned to step 110.

In the aformentioned embodiment, a code indicative of whether or not the memory has been backed up is stored in the area corresponding to the address 0 of the random access memory 54. Such a code may of course be stored with equal effect in any other specified address.

When the power supply $V_{MB}$ is temporarily cut off and connected again, it is probable that a code "10101010" is stored in one address of the 126 addresses of the random access memory 54. Specifically, the code "10101010" may erroneously be stored at the address 0. In order to overcome this problem, the code indicative of whether or not the memory has been backed up may be set not only in areas corresponding to an address such as 0 but also another one or more addresses, thereby preventing the above-mentioned erroneous operation.

As obvious from the foreging description, according to the control method and apparatus of the present invention, it is decided automatically and accurately whether or not the memory has been backed up.

Figure 3:
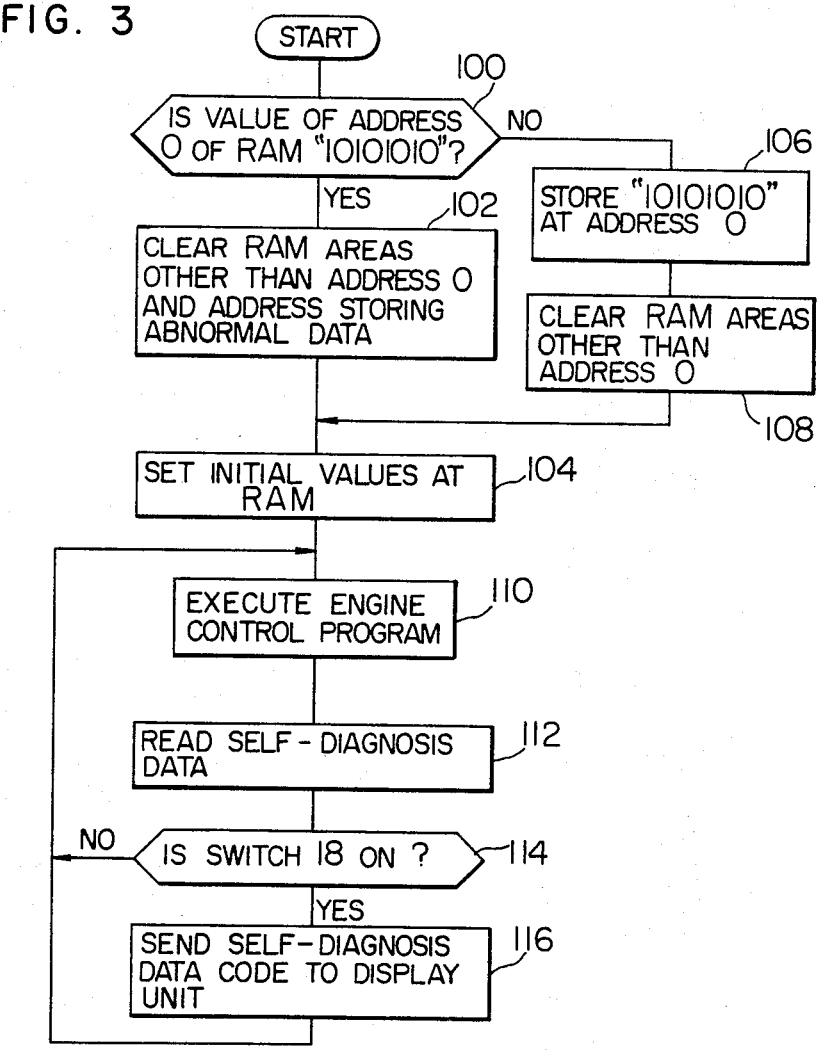
FIG. 3 is a flowchart showing the operation of a CPU incorporated in the control apparatus shown in FIG. 1.

In the above embodiment shown in FIG. 3, the sequence of steps 110-116 may be changed.

The reading and displaying of the diagnosis data may be performed during on engine-stop condition, wherein it is performed by turning on the switch 18 with on state of the ignition key switch 82 and off state of the starter switch 16. The diagnosis data code read out of the RAM may be displayed by a display unit such s CRT etc. for displaying the data as characters, in place of the lamp 74.

The RAM is supplied with an electric power directly from the battery through the terminal 86; however, it may be supplied, in such a manner that it is supplied with power through the ignition key switch 82 when the switch 82 is turned on and directly through the terminal 80 when the switch 82 is turned off.

Now, when the RAM is connected to the battery through the terminal 80 by connecting the connector 86 for the first time, it is decided that the value of the address 0 of the RAM is not "10101010" at step 100 in FIG. 3 when the ignition key switch 82 is turned on.

We claim:

1. In a control apparatus for an internal combustion engine, the improvement comprising:
data processing means responsive to a stored program for controlling respective functions of said engine in accordance with signals representative of operating conditions of said engine, including volatile memory means for storing specific data relating to the operation of the engine; and
power supply means for supplying operating voltage to said data processing means, including a constant voltage circuit in series with a key switch for connecting a voltage supply to said volatile memory and means for connecting said volatile memory directly to said voltage supply;
said data processing means including means for reading out the contents of a specific address of said volatile memory means immediately after said key switch has been closed, for determining whether or not the read-out contents indicate a predetermined specific code, for causing storage of the predetermined specific code into said specific address of said volatile memory means when said read-out contents do not indicate said predetermined specific code and for clearing areas of said volatile memory means other than said specific address and selected addresses when said read-out contents indicate said predetermined specific code.

2. A control apparatus according to claim 1, further including
sensor means for producing sensor signals representative of operating conditions of said engine and for supplying said sensor signals to said data processing means; and
actuator means responsive to control signals from said data processing means for controlling respective functions of said engine;
said data processing means further including diagnostic means for determining during the operation of said engine whether said sensor signals and said control signals fall within predetermined limits and for storing in said volatile memory diagnostic signals representing the result of such determination.

* * * * *